(12) United States Patent
Kirchner et al.

(10) Patent No.: US 9,057,419 B2
(45) Date of Patent: Jun. 16, 2015

(54) LINK CHAIN WITH LINK PLATES MADE OF BORON-MANGANESE STEEL

(75) Inventors: Steffen Kirchner, Tegernau (DE); Stefan Belmer, Anzing (DE)

(73) Assignee: IWIS MOTORSYSTEME GMBH & CO., KG, Munich (DE)

( * ) Notice: Subject to any disclaimer, the term of this patent is extended or adjusted under 35 U.S.C. 154(b) by 292 days.

(21) Appl. No.: 13/700,762

(22) PCT Filed: Mar. 25, 2011

(86) PCT No.: PCT/EP2011/001514
§ 371 (c)(1),
(2), (4) Date: Jan. 11, 2013

(87) PCT Pub. No.: WO2011/150992
PCT Pub. Date: Dec. 8, 2011

(65) Prior Publication Data
US 2013/0203539 A1      Aug. 8, 2013

(30) Foreign Application Priority Data

May 31, 2010   (EP) ..................................... 10005655

(51) Int. Cl.
*F16G 13/06* (2006.01)
*C22C 38/00* (2006.01)
*C22C 38/04* (2006.01)
*C23C 8/22* (2006.01)
*C23C 8/32* (2006.01)
*C23C 10/38* (2006.01)
*F16G 13/04* (2006.01)

(52) U.S. Cl.
CPC .............. *F16G 13/06* (2013.01); *C22C 38/002* (2013.01); *C22C 38/04* (2013.01); *C23C 8/22* (2013.01); *C23C 8/32* (2013.01); *C23C 10/38* (2013.01); *F16G 13/04* (2013.01)

(58) Field of Classification Search
CPC ....... F16G 13/04; F16G 13/06; C22C 38/002; C22C 38/04
USPC .................................................. 474/200–240
See application file for complete search history.

(56) References Cited

U.S. PATENT DOCUMENTS

| | | | |
|---|---|---|---|
| 5,714,116 A | 2/1998 | Beguinot et al. | |
| 6,045,473 A | 4/2000 | Matsumoto et al. | |

(Continued)

FOREIGN PATENT DOCUMENTS

| | | |
|---|---|---|
| CN | 1740023 A | 3/2006 |
| CN | 101148737 A | 3/2008 |

(Continued)

OTHER PUBLICATIONS

Chinese Office Action dated Jan. 30, 2015.

*Primary Examiner* — William E Dondero
*Assistant Examiner* — Robert T Reese
(74) *Attorney, Agent, or Firm* — Baker and Hostetler LLP

(57) ABSTRACT

A link chain is provided, in particular a drive chain of a combustion engine, with chain links connected one to another by a chain articulation. The inner and outer chain links, which preferably are arranged in alternation, each have at least two link plates arranged in parallel with each other, each with two link openings. One link pin in each case extends through one of the link openings of the link plates to form a chain articulation. In this design, the link plates are made of a boron-manganese steel.

20 Claims, 3 Drawing Sheets

(56) References Cited

U.S. PATENT DOCUMENTS

| | | |
|---|---|---|
| 2006/0043791 A1 | 3/2006 | Sho et al. |
| 2007/0254760 A1* | 11/2007 | Murakami et al. ............ 474/231 |
| 2007/0256762 A1* | 11/2007 | Brodt et al. .................. 148/533 |
| 2009/0062051 A1 | 3/2009 | Ogo et al. |
| 2010/0004083 A1 | 1/2010 | Bongard et al. |

FOREIGN PATENT DOCUMENTS

| | | |
|---|---|---|
| DE | 19807852 A1 | 8/1998 |
| DE | 202005011573 U1 | 12/2006 |
| DE | 202006002416 U1 | 8/2007 |
| DE | 102007062400 A1 | 3/2009 |
| EP | 0739993 A1 | 10/1996 |
| EP | 1386978 A2 | 2/2004 |
| EP | 1865086 A1 | 12/2007 |
| GB | 949163 | 2/1964 |
| WO | 2007/009521 A1 | 1/2007 |
| WO | 2007/141152 A1 | 12/2007 |

* cited by examiner

LINK CHAIN WITH LINK PLATES MADE OF BORON-MANGANESE STEEL

CROSS-REFERENCE TO RELATED APPLICATIONS

This application is a National Stage of International patent application PCT/EP2011/001514, filed on Mar. 25, 2011, which claims priority to foreign European patent application No. EP 10005655.5, filed on May 31, 2010, the disclosures of which are incorporated by reference in their entirety.

FIELD OF THE INVENTION

The present invention relates to a link chain, in particular a drive chain of a combustion engine, with chain links, each of which is connected to the next by a chain articulation and has at least two link plates that are made of alloyed steel and that have two link openings, wherein one link pin in each case extends through each of the link openings to form a chain articulation.

BACKGROUND

Conventional link chains employed as drive chains or timing chains in combustion engines are subject to heavy wear during use, particularly in the area of the chain articulation. In addition to the use of alloyed steels for the manufacturing of link plates and link pins, the prior art includes various attempts to improve the wear resistance of the chain articulation. In addition to the use of special high-alloy carbon steels, an improved wear resistance of the chain articulation is achieved through the hardening or coating of the surfaces of the chain articulation. In doing so, tempered steels (e.g., 42 CrMo 4 or 13 CrMoV 13 9) are employed by preference as materials for the manufacturing of link plates and link pins, providing, in addition to a high degree of strength in the material and good wear characteristics in the bearing surface of the chain articulation, the possibility of improving wear resistance through a hardening of the surface layers. Such link chains are described, for example, in DE 20 2005 011 573 U1.

In the manufacture of wear-resistant link plates, only tempered steels with alloying elements such as chromium, molybdenum and vanadium are used, providing, in addition to a thermal hardening ability of the entire component, the targeted hardening of the surface layers through a diffusion process. Alloyed steels with other alloying elements are not used for the manufacture of link plates and/or link pins, since it is often the case that the brittleness of the material or the deviations in strength of the material increase significantly with higher strength values. As an example, alloyed steels using boron as the alloying element exhibit good strength values along with a high degree of hardness, and can also be easily thermally hardened; however, their use is limited to large-sized components for wear and reinforcement applications, for example reinforcement profiles in vehicles, construction parts for agricultural machinery, tracked vehicle chains, wear plates or punching tools. The publication EP 739 993 A1 discloses various alloy compositions for boron-manganese steels, along with their applications for large-sized components. Given the poor miscibility of the alloying element boron in carbon steels, the variance of the individual strength of these individual components increases quite intensely with small-sized components, which is why boron alloyed steels, in particular, are not used for components that are composed of a number of small-sized elements, the weakest link of which determines the wear characteristics and/or service life. An example for this is presented by link chains with a multitude of chain links connected with one another, for which the weakest chain link determines the service life and/or the failure of the link chain. Despite approximately the same strength, the uneven distribution of the alloying element boron in the steel, which has effects particularly in small components, can result in components whose strength varies by many percentage points.

With advancing technical developments, particularly in the automobile sector, there are increasing requirements and pressures to innovate for link chains, as they are used as drive chains or timing chains in combustion engines. In addition to the constant need for improvement of components within the framework of the development of new engines, in light of the cost pressures typical in the automobile industry in conjunction with high quantities, there is generally a need to innovate. Moreover, in terms of generic link chains, cost-effective solutions with low wear problems must be provided.

SUMMARY OF THE INVENTION

Therefore, the present invention has the object of providing a link chain with good wear characteristics and low manufacturing costs.

For a generic link chain, this object is attained by link plates being manufactured from a boron-manganese steel, wherein, for use as link chains, the boron-manganese steel has a mass proportion of carbon (C) of between 0.35 and 0.45% by weight.

The use of boron steels as hot-rolled hardenable steel plate for manufacturing wear and reinforcement parts in high-load areas of application, such as agriculture or construction machinery, is well-known. In addition to high strength, boron alloyed steels exhibit good resilience in the core of the material and trouble-free heat treatment. With the addition of boron, low carbon content and thus improved processability can be achieved compared with other alloying elements with the same hardness. In addition, boron makes it possible to entirely or partially dispense with expensive alloying elements such as chromium, nickel and molybdenum. However, in contrast to elements with good affinity for carbon, such as chromium and molybdenum, the distribution of the relatively small proportion of the alloying element boron in the alloyed steel is quite uneven, which is why boron-containing steels, despite their good material characteristics, are only used for large-sized wear components and structural components, in which the differences in concentration and thus the differences in strength are balanced out. Boron-manganese steels are provided as hot-rolled steel plates, which are alloyed with a relatively low percentage of boron of 0.0008 to 0.0080%, in order to improve the strength characteristics of the alloyed steel. For small-sized components connected in series, the varying concentration of boron in the material leads to a high variation in the strength of the individual components, and thus a failure that is premature for the average strength of the material.

Surprisingly, link chains with link plates that are made of a boron-manganese steel with a carbon content of between 0.35 and 0.45% by weight, such as 38 MnB 5 or 42 MnB 5, show wear characteristics that are more favourable than link chains with link plates made of tempered steel with alloying elements having good carbon affinity, such as 42 CrMo 4, despite a similar strength of materials. In view of the miscibility problems of the alloying element boron in carbon steels, wear characteristics that are worse on the whole, i.e., a low life span and an increased elongation of the link chain over the service life, or, at best, comparable, must be expected with a comparable strength. Regardless of the type of assembly and construction method of the link chain, in runtime tests with link plates made of boron-manganese steel, the elongation of a link chain under the invention is reduced by at least 10% compared to a link chain with plates made of a conventional tempered steel (42 CrMo 4). Since no additional negative signs of wear could be detected in the individual link plates, an extension of the service life of at least 10% can also be expected with a design under the invention of a link chain.

An additional advantage of a link chain under the invention, in which the link plates are manufactured from a boron-manganese steel, is the avoidance of segregations in the hot-rolled band material made of tempered steel that is used to produce the link plates. Segregations arise through the alloying elements with affinity for carbon, chromium and molybdenum, which are bound to the carbon of the tempered steel into regionally concentrated carbides, for instance in the hot band slab. During the rolling process with the intermediate annealing of the slab, such carbides are then released and the carbon and/or alloyed concentrations are rolled out, which leads to regionally uneven concentrations of the alloying elements and the carbon, primarily transverse to the rolling direction, but also along the rolling direction. Correspondingly, there are segregation lines in the hot band from the regional segregations in the slab. Even if the chromium and molybdenum carbides produced during pouring of the slab are released during a heat treatment, regional differences in the concentration of the alloying elements of carbon, chromium and molybdenum remain, with carbides again being produced from carbon and chromium and/or molybdenum that have diffused out together in these regions with higher concentration upon cooling off. If the segregation lines in the hot-rolled band material run in or run out in geometrically and topographically unfavourable regions, for example the link openings of the link plates, the chromium or molybdenum carbides lead to local stress increases. Depending on the manufacturing of the link plates, punch marks may arise, particularly in the area of the segregation lines, which further reinforce the local stress increases. Therefore, segregations in tempered steels with alloying elements having an affinity for carbon can lead to a significantly earlier failure of the affected link plates in a link chain, in comparison to link plates with a homogeneous distribution of alloys. By contrast, link plates made of a boron-manganese steel are free of segregation lines, since the alloying elements manganese and boron do not have an affinity for carbon, and a corresponding mechanism of action cannot occur in hot-rolled bands made of manganese-boron steel.

It is useful in this context for the mass proportion of manganese in the boron-manganese steel to be between 1.1 and 1.7 percent by weight. Furthermore, for an optimal link plate, it is advantageous if the mass proportion of boron in the boron-manganese steel is between 0.0008 and 0.0080 percent by weight, preferably between 0.004 and 0.008 percent by weight. For a strong arrangement of the link plate, the tensile strength of the boron-manganese steel favourably amounts to between 500 and 700 N/mm$^2$, preferably between 550 and 650 N/mm$^2$, where this tensile strength refers to the rolled condition of a boron-manganese steel band prior to a further treatment, i.e. the manufacturing of the link plates and a final heat treatment. These special material characteristics of boron-manganese steel are advantageous individually or in combination with each other for an optimised, wear-resistant arrangement of the link plate manufactured entirely from a boron-manganese steel for a link chain under the invention.

A favourable embodiment provides that the link pin is manufactured from a carbon steel or from an alloyed steel, and exhibits a case-hardened, carburised, nitrided or chromed surface layer. In combination with link pins coated with carbides or nitrides or case-hardened link pins, as the case may be, the link plates made of boron-manganese steel of a link chain under the invention exhibit particularly favourable wear characteristics, with a higher fatigue strength of the link plates.

A preferred design provides that the profile of the link plates is punched out of a steel plate made of boron-manganese steel, wherein the trimmed regions of the profile of the link plates, in particular the link openings, exhibit a smooth cut portion of the cut surface of at least 75%, preferably at least 80%. A large smooth cut portion reduces the wear of the contact and link surfaces. In particular, a large smooth cut portion in the link opening of the link plates reduces the wear of the link partners (i.e., the link pin and the link opening) occurring in the particular chain articulation, since the load-bearing surface of the chain articulation increases. This reduces the elongation of the link chain in relation to its lifespan. Moreover, an increased smooth cut portion reduces the mechanical stress, and hence also the wear, of the cutting tool during manufacture of the link plate.

It is further advantageous if the ratio of the thickness of the link plates, i.e. the material thickness of the boron-manganese steel for manufacturing the link plates, to the pitch of the link plates is at most 0.45. Link plates with a lower thickness of a maximum of 3.5 mm and a corresponding pitch allow for the necessary flexibility of the link chain with a sufficient strength, without reducing the smooth cut portion of the cut surface of the link openings, corresponding to the low-wear link surfaces of the chain articulation.

In order to allow for the use of the link chain under the invention in the particular areas of application (for example, as drive means for continuously variable transmissions or as timing chains), the link chain may be designed as a plate-link chain, particularly as a toothed plate-link chain. Preferably, in order to form the chain articulation, the link pins can extend through the link openings in at least two outer link plates arranged on the outside and in one or more inner link plates arranged in an alternating manner as a stack. Such link chains made of plate stacks with inner and outer link plates are manufactured as simple plate-link chains or toothed plate-link chains in large quantities, with a high degree of automation, for many industrial sectors. Since the link pin extends through several link openings arranged next to each other, which rotate relative to one another in an alternating arrangement, the good sliding characteristics of the link pin in the link openings of the link plates made of boron-manganese steel are of particular importance.

For an additional area of application, the link chain may be designed as a sleeve-type chain or a roller chain. Depending on the construction of the sleeve-type chains or roller chains, two link plates arranged at a distance from one another are connected by a link sleeve through which the link pin of the chain articulation extends and connects the link plates of the next chain link in one simple manufacturing process.

An advantageous embodiment of this link chain provides that inner chain links that have at least two inner link plates and two link sleeves connecting the inner link plates to one another with parallel spacing, and outer chain links that have at least two outer link plates and two link pins connecting the outer link plates to one another with parallel spacing, are each connected to one another in alternation by a chain articulation. Link chains made of inner and outer chain links, in particular roller chains and sleeve-type chains, are manufactured both for the automotive industry and for almost all other industrial sectors as a mass product, which accordingly leads to low costs for this type of link chain. With this type, the link sleeves are often firmly connected to the inner plate, in particular through pressing in or gluing in place.

BRIEF DESCRIPTION OF THE DRAWINGS

The following more specifically describes examples of embodiments of the present invention based on the attached drawings. They show.

DETAILED DESCRIPTION

Figure 1:
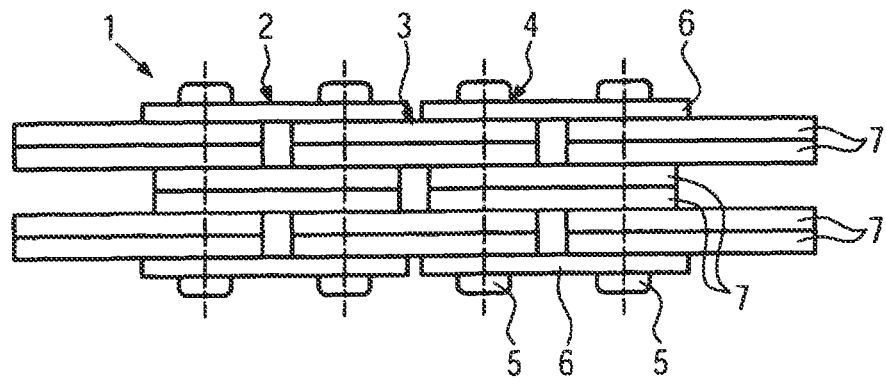
FIG. 1 a top view of a plate-link chain under the invention.

FIG. 1 shows a top view of a link chain 1 under the invention in one embodiment as a plate-link chain with outer chain links 2 and inner chain links 3 alternating with each other, each connected to one another in a chain articulation 4 by means of a link pin 5. The outer chain links 2 in this embodiment consist of two outer link plates 6 arranged laterally to the outside with parallel spacing to one another and two inner link plates 7 arranged as a stack located on the inside, along with the two chain pins 5 of the associated chain articulation 4, which extend through the outer link plates 6 and the inner link plates 7. The inner chain links 3 each have two stacks of inner link plates 8, wherein the inner link plates are arranged in a pivoting manner on the chain pins 5 of the outer chain links 2 between the outer link plates 6 and the inner link plates 7 of the outer chain links 2, in order to connect the inner chain links 3 with the adjacent outer chain links 2.

Figure 2:
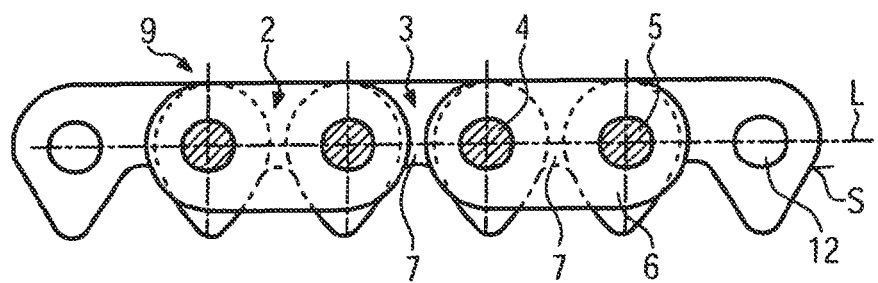
FIG. 2 a side view of the plate-link chain from FIG. 1 in an embodiment as a toothed chain, FIG. 3 a side view of the plate-link chain from FIG. 1 in an embodiment as a leaf chain, FIG. 4 a top view of a further embodiment of a plate-link chain under the invention with a partial cross-section, FIG. 5 a side view of a toothed plate of the toothed chain from FIG. 2, FIG. 6 a part of a magnified sectional view of the toothed plate from FIG. 5 along the longitudinal axis of the link plate, and FIG. 7 a diagram of the elongation of a plate-link chain under the invention over the service life, compared to a conventional plate-link chain.

FIG. 2 shows a link chain 1 under the invention in one embodiment as a toothed plate-link chain 9. In this embodiment, the inner link plates 7 of the outer chain link 2 and the inner link plates 7 of the inner chain link 3 are designed as toothed plates 14, while the outer link plates 6 in the embodiment that is shown are designed as guide plates without protruding teeth 15 and without recesses 16 for meshing into the teeth of a corresponding chain wheel. In other embodiments, the outer link plates 6 can also be designed as toothed plates. In addition or as an alternative to the outer link plates 6, the inner link plates 7 of the outer chain link 2 may optionally be provided as inner guide plates.

Figure 3:
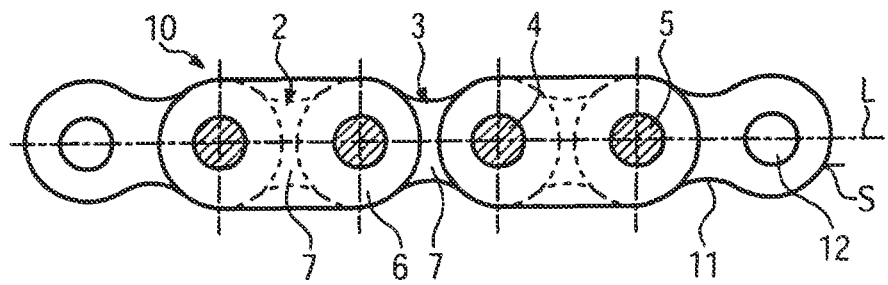

By contrast, FIG. 3 shows a link chain 1 under the invention in one embodiment as a leaf chain 10. For the leaf chain 10, both the outer link plates 6 and the inner link plates 7 of the outer chain link 2, and the inner link plates 7 of the inner chain link 3, are designed as essentially straight link plates, without teeth protruding on one or both sides and/or recesses for meshing into the teeth of a corresponding chain wheel. In the embodiment that is shown, the outer link plates 6 are formed as straight plates, while the inner plates 7 are designed in a taper-cut manner, i.e., they exhibit a tapering 11 in the form of concave notches in both back areas in the longitudinal direction of the inner link plates 7. In addition to the tapering 11, the link plates can also exhibit holes or cutouts for the saving of materials without affecting strength. Moreover, the outer link plates 6 may also be designed with a tapering 11 and/or cutouts.

Regardless of the arrangement of the link chain 1 under the invention as a toothed plate-link chain 9 or as a leaf chain 10, the outer link plates 6 and the inner plates 7 in each case exhibit two link openings 12, which are arranged offset to one another on the longitudinal axis L of the outer link plate 6 or inner link plate 7 and are associated with the respective end faces S of the link plate. The link pins 5 of the chain articulations 4 in each case extend through the link openings 12 of the external outer link plates 6 and the inner link plates 7 arranged in between, so that a pivoting connection, the chain articulation 4, forms between the outer chain links 2 and the inner chain links 3.

Figure 4:
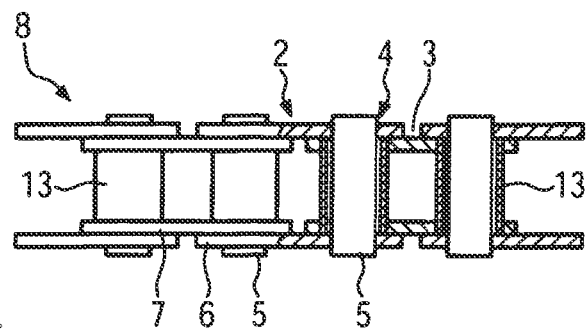

FIG. 4 shows a further embodiment of the link chain 1 under the invention, which in one embodiment is designed as a sleeve-type chain 8. The following presents a description of the material differences from the plate-link chains shown in FIGS. 1 through 3. For elements that are identical and have the same effect, the same reference figures are used. Regarding the embodiment and function of the elements not described in detail, reference is made to the description above.

The sleeve-type chain 8 from FIG. 4 likewise exhibits outer chain links 2 and inner chain links 3 alternating with each other, each connected to one another through a chain articulation 4. Here, the inner chain link 3 consists in each case of two inner link plates 7 arranged in parallel and two link sleeves connecting the inner link plates 7 to one another, where the link sleeves 13 are located at right angles to the inner link plates 7 and are firmly connected with the inner link plates 7, particularly through pressing. The outer chain links 2 in turn consist of two outer link plates 6 arranged in parallel, which are connected to one another by two link pins 5, wherein the link pins 5 are mounted in a pivoting manner in the link sleeves 13 of the inner chain links 3. Therefore, the outer chain link 2 is connected to the inner chain link 3 in a pivoting manner by means of the link pins 5, so that the outer chain links 6 are parallel to the inner chain links 7. The link pin 5 of the chain articulation 4 is mounted in a pivoting manner in the link sleeves 13 of the inner chain links 3, wherein the axes of the nested link pins 5 and link sleeves 13 are aligned with each other.

The sleeve-type chain 8 shown in FIG. 4 may also be provided with rollers and thus be realised as a roller chain. For such a roller chain, the inner chain links 3 are also provided with additional rollers, which are arranged in a pivoting manner on the link sleeves 13 between the inner link plates 7. The rollers in this design are located at right angles to the inner link plates 7, so that the axes of the nested rollers, link sleeves 13, and link pins 5 are aligned with each other. Between the rollers and the link sleeves 13, a cushion of grease is provided, which contributes to the noise and shock absorption of the roller chain.

Figure 5:
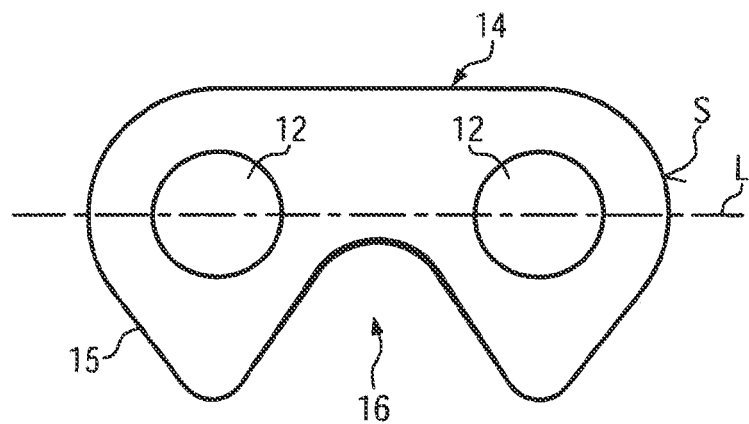

FIG. 5 shows an embodiment of an inner link plate 7 or an outer link plate 6 for a toothed plate-link chain 9 according to the present invention. This toothed plate 14 exhibits two link openings 12, which are arranged offset to one another on the longitudinal axis L of the toothed plate 14 and are associated with the respective end faces S of the toothed plate 14. The link pins 5, not shown here, extend through these link openings 12. For meshing into the teeth of a corresponding chain wheel, the toothed plate 14 has two teeth 15 protruding on one side of the longitudinal axis L along with one recess 16 provided between the two teeth 15.

The manufacturing of link plates 6, 7 for the link chain 1 under the invention is typically effected in a punching process, with which various sections of the profile of the link plate are punched out from a steel band made of a boron-manganese steel, alternately from the top side and bottom side of the steel band. In the manufacturing of the toothed plate 14 shown in FIG. 5, the trimmed areas of the outer profile, i.e. the edges of the teeth 15, the inner profile of the recess 16 along with the back area of the toothed plate 14, and the link openings 12, are initially pre-punched out of the steel band by means of a suitable punch stamp. Then, these pre-punched areas are finely cut with a trimming punch in order to achieve a smooth cut portion G that is as large as possible in the cut surface of the trimmed profiles or the link openings 12. As the last step of the punching, the areas of the profile that are not trimmed are punched out from the steel band in a simple cutting process, thus resulting in the toothed plate 14 being removed from the steel band. Finally, depending on the requirements for the toothed plate 14 or for the trimmed areas, and the quality of the smooth cut portion G, a vibratory finishing is effected for the deburring of the feed-in side along with the smoothing of the punch marks and the cracked surface area R.

Figure 6:
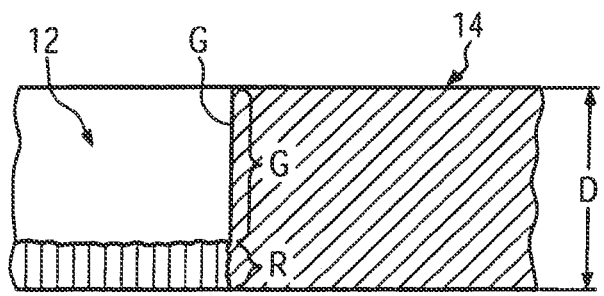

As can be seen in FIG. 6, the smooth cut portion G in the link opening 12 of a toothed plate 14 manufactured from boron-manganese steel amounts to at least 75% or more of the plate thickness D of the punched out toothed plate 14 or any other correspondingly manufactured link plate 6, 7. In the direction of punching below the smooth cut portion G, a smaller area of a cracked surface web R, the rough cut portion, follows, which as a result of the tear-out of the cutting process during trimming of the profile or the link openings 12 exhibits a very rough surface, which for the most part is set back from the smooth cut portion G. Since, to a large extent, the fatigue strength of a toothed plate 14 or other link plates 6, 7 for link chains 1 results from the smooth cut portion G, through which essentially all of the load is transmitted in operation of a link chain 1, in particular a toothed plate-link chain 9, it is possible using a link chain 1 under the invention to increase the service life or the permissible load for the operation of the link chain 1 under the invention in comparison to a conventional link chain.

In addition to the smooth cut portion G in the link opening 12, the cylindrical surface of the link pin 5 forms the bearing surface of the chain articulation 4, which is why the design of the link pin 5 made of an alloyed steel is also advantageous. In addition, the surface layer of the link pin may be case-hardened, or may exhibit a carburised, nitrided, carbonitrided or chromed surface layer, which increases the wear resistance of the chain articulation 4 on the side of the link pin 5.

Figure 7:
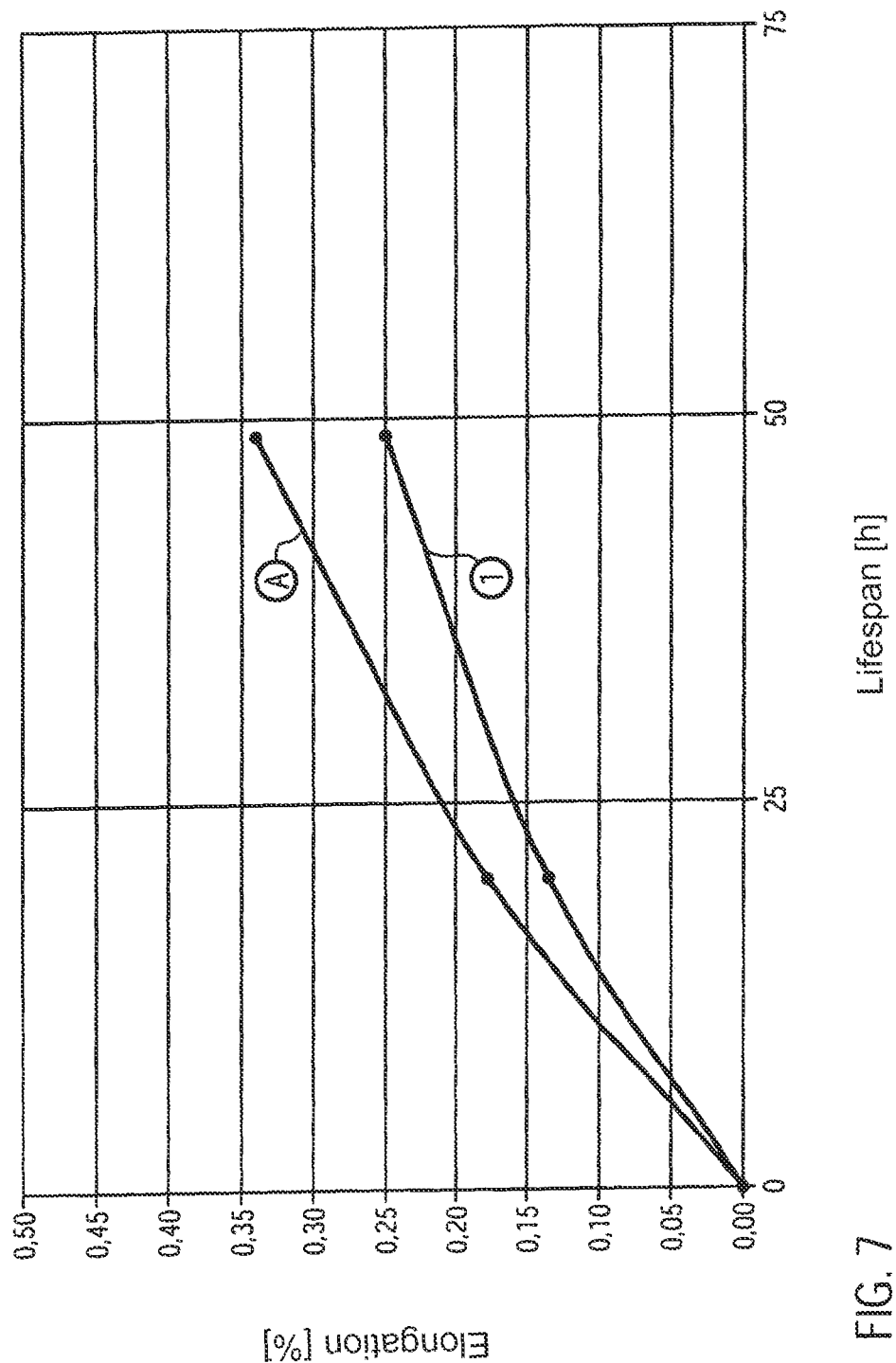

FIG. 7 shows the graphical representation of the percentage chain elongation of a link chain 1 under the invention in a trial run over the lifespan, in comparison to a conventional link chain A. The only difference between the link chain 1 under the invention and the conventional link chain A is in the material of the link plates. All other details, such as the link pins that are used, and the mounting of the chain along with the manufacturing of the link plates, are identical in each case.

With the conventional link chain A, the link plates were manufactured from a chrome-molybdenum steel, 42 CrMo 4; in doing so, the usual punching processes described above were used. By contrast, the link plates 1 under the invention were manufactured from a boron-manganese steel, 42 MnB 5 in an identical production process. In this context, the different steel alloys—the chrome-molybdenum steel for the link plates of the conventional link chain A and the boron-manganese steel for the link plates of the link chain 1 under the invention—exhibit comparable strength values, which in principle lead to an expectation of comparable wear characteristics.

Surprisingly, the percentage elongation of a link chain 1 under the invention is reduced in comparison to a structurally identical conventional link chain A. Depending on the design of the chain and various manufacturing details, for example the post-processing of the link openings after punching by means of a vibratory finishing, the surface treatment of the link pins, the assembly of the link chains and their pitch, the percentage elongation of the link chain 1 under the invention is reduced by at least 10% to 30% in comparison to a conventional link chain A. This clear reduction in the elongation of the link chain 1 under the invention over the lifespan, and thus also the expected service life of the link chain 1, is completely surprising, since the mixing problems in conjunction with adding the alloying element boron to steels as a result of the comparatively small quantity of boron of approximately 0.005 to 0.008% by weight for the material thickness that is necessarily low for the link plates, would be expected to cause large fluctuations in strength and thus also short service lives and significant wear-related consequences, such as the elongation of the link chain.

In light of the comparable strength of the boron-manganese steel employed for the link plates 6, 7, the significant wear reduction or reduction in chain elongation that has surprisingly been determined in the link chain under the invention can be explained only by a number of surprising, positive effects resulting from the use of a boron-manganese steel for manufacturing the link plates 6, 7. Rather, the combination of various aspects in the manufacturing of link plates 6, 7 from boron-manganese steel, including the enlargement of the smooth cut portion, the reduction of the punch marks and degree of punching, the avoidance of segregation lines and the improved sliding characteristics in the chain articulation 4 relative to the surface layer of the link pin 5, appear to lead to a surprisingly great positive improvement in wear, which overcompensate for the known disadvantages of the alloying element boron in terms of mixing problems and concentration differences in the material for the links chains under the invention.

The invention claimed is:

1. A link chain comprising:
   chain links, each of the chain links being connected to the next by a chain articulation and having at least two link plates, the link plates being made of alloyed steel and having at least two link openings,
   wherein one link pin extends through each of the link openings to form a chain articulation,
   wherein the link plates are manufactured from a boron-manganese steel and are formed using at least one of a cutting process and a punching process, and
   wherein the mass proportion of carbon in the boron-manganese steel is between 0.35% and 0.45% by weight.

2. The link chain according to claim 1, wherein the mass proportion of manganese in the boron-manganese steel is between 1.1% and 1.7% by weight.

3. The link chain according to claim 1, wherein the mass proportion of boron in the boron-manganese steel is between 0.0008% and 0.0080% by weight.

4. The link chain according to claim 3, wherein the mass proportion of boron in the boron-manganese steel is between 0.0040 and 0.0080% by weight.

5. The link chain according to claim 1, wherein the tensile strength of the boron-manganese steel is between 500 N/mm$^2$ and 700 N/mm$^2$.

6. The link chain according to claim 5, wherein the tensile strength of the boron-manganese steel is between 550 and 650 N/mm$^2$.

7. The link chain according to claim 1, wherein the ratio of the thickness of the link plates to the pitch of the link plate is between 0.0 and 0.45 at the most.

8. The link chain according to claim 1, wherein the link pin is manufactured from a carbon steel or from an alloyed steel, and wherein the link pin has a carburised, nitrided or chromed surface layer.

9. The link chain according to claim 1, wherein the profile of the link plates is punched out of a steel plate made of boron-manganese steel, and wherein the link openings have a smooth cut portion of the cut surface of at least 75%.

10. The link chain according to claim 9, wherein the link openings have a smooth cut portion of the cut surface of at least 80%.

11. The link chain according to claim 1 wherein the link chain is designed as a plate-link chain.

12. The link chain according to claim 11, wherein the link pin, in order to form the chain articulation, extends through the link openings in at least two outer link plates arranged on the outside and in one or more inner link plates arranged as a stack or in an alternating manner.

13. The link chain according to claim 11, wherein the link chain is designed as a toothed silent chain.

14. The link chain according to claim 1, wherein the link chain is designed as a sleeve-type chain or as a roller chain.

15. The link chain according to claim 14, wherein the inner chain links that have at least two inner link plates and two link sleeves connecting the inner link plates to one another with parallel spacing, and outer chain links that have at least two outer link plates and two link pins connecting the outer link plates to one another with parallel spacing, are connected to one another in alternation by a chain articulation.

16. The link chain according to claim 1, wherein the link chain is a drive chain of a combustion engine.

17. A link chain comprising:
   chain links, each of the chain links being connected to the next by a chain articulation and having at least two link plates, the link plates being made of alloyed steel and having at least two link openings,
   wherein one link pin extends through each of the link openings to form a chain articulation,
   wherein the link plates are manufactured from a boron-manganese steel and are formed using at least one of a cutting process and a punching process, and
   wherein the mass proportion of boron in the boron-manganese steel is between 0.0008% and 0.0080% by weight.

18. The link chain according to claim 17, wherein the mass proportion of boron in the boron-manganese steel is between 0.0040 and 0.0080% by weight.

19. The link chain according to claim 17, wherein the mass proportion of manganese in the boron-manganese steel is between 1.1% and 1.7% by weight.

20. The link chain according to claim 17, wherein the tensile strength of the boron-manganese steel is between 500 N/mm$^2$ and 700 N/mm$^2$.

* * * * *